(12) United States Patent
Yu et al.

(10) Patent No.: US 8,300,934 B2
(45) Date of Patent: Oct. 30, 2012

(54) IMAGE PROCESSING DEVICE AND IMAGE CORRECTION DEVICE

(75) Inventors: Shanshan Yu, Kawasaki (JP); Masayoshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 182 days.

(21) Appl. No.: 12/805,210

(22) Filed: Jul. 19, 2010

(65) Prior Publication Data
US 2010/0290702 A1    Nov. 18, 2010

Related U.S. Application Data

(63) Continuation of application No. PCT/JP2008/051004, filed on Jan. 24, 2008.

(51) Int. Cl.
*G06K 9/00* (2006.01)
(52) U.S. Cl. .......................................................... 382/168
(58) Field of Classification Search ........... 382/168–172
See application file for complete search history.

(56) References Cited

U.S. PATENT DOCUMENTS

| | | | | |
|---|---|---|---|---|
| 5,410,418 | A * | 4/1995 | Yonezawa | 382/169 |
| 6,028,958 | A * | 2/2000 | Kanamori | 382/171 |
| 2001/0033260 | A1* | 10/2001 | Nishitani et al. | 345/87 |
| 2002/0118889 | A1* | 8/2002 | Shimizu | 382/274 |
| 2005/0194445 | A1* | 9/2005 | Takakura et al. | 235/462.1 |
| 2008/0187235 | A1* | 8/2008 | Wakazono et al. | 382/255 |
| 2012/0070084 | A1* | 3/2012 | Yu | 382/170 |

FOREIGN PATENT DOCUMENTS

| | | |
|---|---|---|
| JP | 6-332399 | 12/1994 |
| JP | 8-9197 | 1/1996 |
| JP | 2000-102033 | 4/2000 |
| JP | 2003-248822 | 9/2003 |
| JP | 2006-13742 | 1/2006 |
| JP | 2006-98614 | 4/2006 |
| JP | 2006-319953 | 11/2006 |

OTHER PUBLICATIONS

International Search Report for PCT/JP2008/051004, mailed on Feb. 26, 2008.
Rafael C. Gonzalez et al., "Digital Image Processing," Second Edition, Prentice Hall, 2001, 6 pages.

* cited by examiner

*Primary Examiner* — Alex Liew
(74) *Attorney, Agent, or Firm* — Staas & Halsey LLP

(57) ABSTRACT

An image processing device includes a dividing unit which divides a brightness histogram of an input image into a plurality of value regions according to gradation, a ratio computing unit which computes the number of pixels of each value region divided by the dividing unit and the number of pixels of the input image, respectively, and computes a ratio or a magnitude relation of the number of pixels of each value region with respect to the number of pixels of the input image, and a control-point computing unit which computes a control point, which specifies a shape of a correction curve for image correction according to a feature of the input image, based on the ratio or the magnitude relation of each value region computed by the ratio computing unit.

6 Claims, 12 Drawing Sheets

FLEXION POINT$_{\text{BRIGHT PORTION\_INTERMEDIATE}}$ $$= 255\left(1 - \frac{\text{FREQUENCY OF BRIGHT PORTION}}{W1 \cdot \text{TOTAL FREQUENCY}}\right) \quad \text{W1 IS WEIGHT (W1>0)}$$

FLEXION POINT$_{\text{INTERMEDIATE\_DARK PORTION}}$ $= \text{FLEXION POINT}_{\text{BRIGHT PORTION\_INTERMEDIATE}} - 255 \dfrac{\text{FREQUENCY OF INTERMEDIATE PORTION}}{W2 \cdot \text{TOTAL FREQUENCY}}$   W2 IS WEIGHT (W2>0)

FIG.6

(A) $\text{CONTROL POINT}_{\text{BRIGHT PORTION\_INTERMEDIATE}}$
= LUT [BRIGHT PORTION FREQUENCY]

(B) $\text{CONTROL POINT}_{\text{INTERMEDIATE\_DARK PORTION}}$
= LUT [INTERMEDIATE PORTION FREQUENCY]
× $\text{CONTROL POINT}_{\text{BRIGHT PORTION\_INTERMEDIATE}}$ /255

FIG.7

CORRECTION AMOUNT
= $\text{FLEXION POINT}_{\text{VERTICAL COORDINATE}}$ − $\text{FLEXION POINT}_{\text{HORIZONTAL COORDINATE}}$

FIG.8

CORRECTION AMOUNT IN WHICH CHANGE RANGE IS LIMITED $$= \begin{cases} Th5 & \text{CORRECTION AMOUNT} \leq Th5 \\ \text{CORRECTION AMOUNT} & Th5 < \text{CORRECTION AMOUNT} < Th6 \\ Th6 & \text{CORRECTION AMOUNT} \geq Th6 \end{cases}$$

$0 \leq Th5 < Th6 \leq 255$

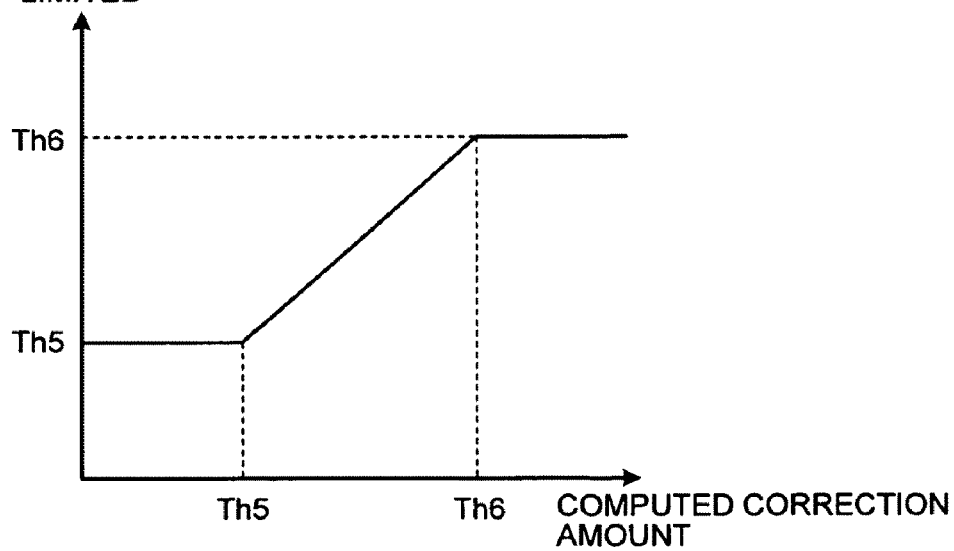

(A) $\quad y = \dfrac{y1-y2}{x1-x2} x - \dfrac{x2y1-x1y2}{x1-x2} \qquad x=0, 1, 2, \cdots, 255$ (B) $\quad y = (y2-y1)\left(\dfrac{x-x1}{x2-x1}\right)^{\gamma} + y1 \qquad \begin{array}{l} x=0, 1, 2, \cdots, 255 \\ 0 < \gamma < 1 \end{array}$

IMAGE PROCESSING DEVICE AND IMAGE CORRECTION DEVICE

CROSS-REFERENCE TO RELATED APPLICATION(S)

This application is a continuation of International Application No. PCT/JP2008/051004, filed on Jan. 24, 2008, the entire contents of which are incorporated herein by reference.

FIELD

The embodiments discussed herein are directed to an image processing device which computes a control point for specifying a shape of a correction curve for image correction according to a feature of an input image.

BACKGROUND

Conventional image correction for correcting images such as moving images or still images allows output of clear and easy-to-see images corresponding to various scenes by performing correction according to a feature of an input image. For example, when correcting an image taken by a digital camera, if a gradation of a dark portion is difficult to see as in a backlit image, correction is performed for each pixel of the image for brightening the dark portion.

In R. C. Gonzalez, R. E. Woods, *Digital Image Processing*, P91 to P94, as illustrated in FIGS. 17 and 18, image correction is performed to make a histogram after image correction processing have equalized distribution. More specifically, the image correction is performed to make a histogram after image processing have equalized distribution, by dividing a histogram computed from an input image into a plurality of bins such as bins of a dark portion, an intermediate portion, and a bright portion depending on a degree of luminance, and expanding or compressing a gradation according to a ratio of the number of pixels of each bin to the total number of pixels. FIGS. 17 and 18 are diagrams for explaining histogram equalization in image correction according to a conventional technology.

In R. C. Gonzalez, R. E. Woods, *Digital Image Processing*, P91 to P94, after equalizing the histogram, as illustrated in FIGS. 19 and 20, a correction curve used for image correction is computed, and then image correction is performed. More specifically, image correction is performed by using a correction curve which is computed according to the ratio of the number of pixels of each bin to the total number of pixels. That is, in R. C. Gonzalez, R. E. Woods, *Digital Image Processing*, P91 to P94, when a ratio of the number of dark pixels to the whole image is large, as illustrated in FIG. 19, a correction amount of the dark portion is largest, and a correction direction is corrected in a brightening direction. However, in R. C. Gonzalez, R. E. Woods, *Digital Image Processing*, P91 to P94, when a ratio of the number of bright pixels to the whole image is large, as illustrated in FIG. 20, a correction amount of the bright portion is largest, and a correction direction is corrected in a darkening direction. FIGS. 19 and 20 are diagrams for explaining image correction processing through histogram equalization according to a conventional technology.

However, the above-mentioned conventional technology has a problem in that it is costly. Further, there is a problem in that the stability of an output image is low.

Specifically, when correcting an image in which a gradation of the dark portion is difficult to see, as in a backlit image, a control of a correction amount is required for each pixel, resulting in complicated processing and further cost. Further, when the image correction is performed, as in R. C. Gonzalez, R. E. Woods, *Digital Image Processing*, P91 to P94, such that the histogram after image correction has equalized distribution, a correction amount and a correction direction are not limited. Hence, some images are corrected such that the dark portion is further darkened, resulting in an unnatural gradation. Thus, the stability of an output image is low.

SUMMARY

According to an aspect of an embodiment of the invention, an image processing device includes: a dividing unit which divides a brightness histogram of an input image into a plurality of value regions according to gradation; a ratio computing unit which computes the number of pixels of each value region divided by the dividing unit and the number of pixels of the input image, respectively, and computes a ratio or a magnitude relation of the number of pixels of each value region with respect to the number of pixels of the input image; and a control-point computing unit which computes a control point, which specifies a shape of a correction curve for image correction according to a feature of the input image, based on the ratio or the magnitude relation of each value region computed by the ratio computing unit.

According to another aspect of an embodiment of the invention, an image correction device, which corrects an image according to a feature of an input image, includes: a dividing unit which divides a brightness histogram of the input image into a plurality of value regions according to gradation; a ratio computing unit which computes the number of pixels of each value region divided by the dividing unit and the number of pixels of the input image, respectively, and computes a ratio or a magnitude relation of the number of pixels of each value region with respect to the number of pixels of the input image; a control-point computing unit which computes the control point which specifies a shape of a correction curve for image correction based on the ratio or the magnitude relation of each value region computed by the ratio computing unit and further limits the computed control point to within a predetermined range to compute a corrected control point; a correction-curve computing unit which computes a correction curve based on the control point computed by the control-point computing unit; and an image correcting unit which corrects the input image based on the correction curve computed by the correction-curve computing unit.

According to still another aspect of an embodiment of the invention, a computer readable storage medium has stored therein an image processing program, and the image processing program causes a computer as an image processing device to execute a process including: dividing a brightness histogram of an input image into a plurality of value regions according to gradation; firstly computing the number of pixels of each value region divided in the dividing and the number of pixels of the input image, respectively, and computing a ratio or a magnitude relation of the number of pixels of each value region with respect to the number of pixels of the input image; and secondly computing a control point, which specifies a shape of a correction curve for image correction according to a feature of the input image, based on the ratio or the magnitude relation of each value region computed in the firstly computing.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 6 illustrates an equation used when computing a control point based on a look-up table;

FIG. 7 illustrates an equation for computing a correction amount of a flexion point according to the first embodiment;

FIG. 8 is a diagram for explaining a case of limiting a correction amount of a flexion point according to the first embodiment;

DESCRIPTION OF EMBODIMENT(S)

Preferred embodiments of the present invention will be explained with reference to accompanying drawings. An outline and a feature of an image processing device according to a first embodiment and a configuration and a flow of processing of the image processing device are explained in this order, and effects of the present embodiment are lastly explained. In the following embodiments, a flexion point of a correction curve is explained as an example of a control point which specifies the shape of the correction curve, but the control point employed as a computation target in the present embodiment is not limited to the flexion point of the correction curve.

[a] First Embodiment

Figure 1:
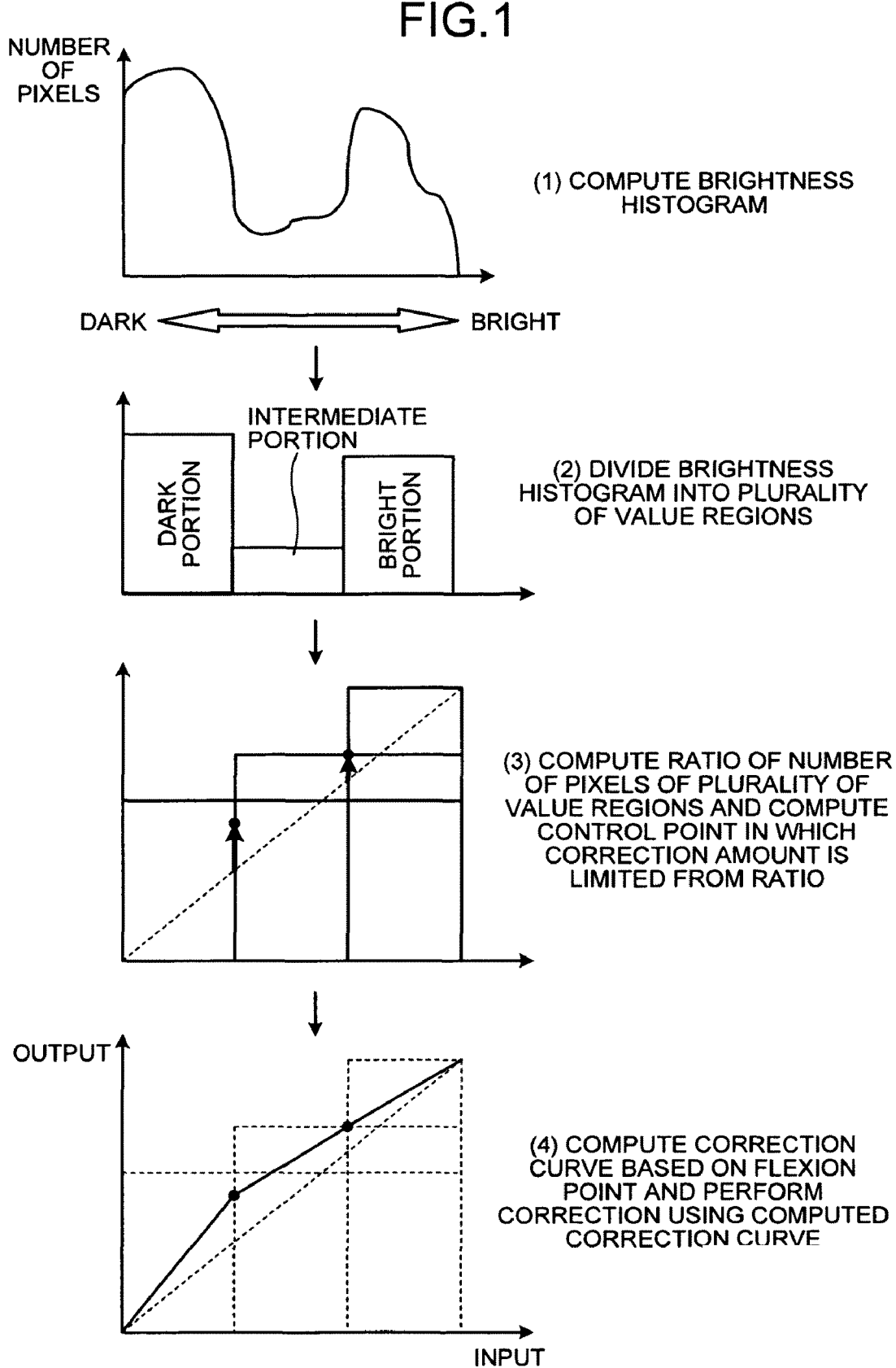
FIG. 1 is a diagram illustrating an outline and a feature of an image processing device according to a first embodiment.

Outline and feature of image processing device Next, an outline and a feature of an image processing device according to a first embodiment are explained. FIG. 1 is a diagram illustrating an outline and a feature of the image processing device according to the first embodiment.

Generally, in image processing of a backlit image, an image quality depends on how to output a dark portion of an image. The image processing device computes the control point which specifies the shape of the correction curve for image correction according to a feature of an image such as a moving image or a still image which is input from a different device connected to the image processing device.

In such a configuration, an outline of the image processing device is that it computes the control point which specifies the shape of the correction curve for image correction according to a feature of an input image. Specifically, a main feature of the image processing device is that the image processing device is capable of computing the control point of the correction curve, and through which stable and high-quality image correction can be performed without requiring the cost when correcting an image.

The main feature is explained below. When an input image is received, the image processing device computes a brightness histogram of the image (see part (1) of FIG. 1) and divides the brightness histogram of the image into a plurality of value regions according to gradation (see part (2) of FIG. 1).

More specifically, when an input image such as a moving image or a still image is received, the image processing device reads the image to compute a brightness component for each pixel and computes the brightness histogram of the image based on the frequency of occurrence of the computed brightness component. Subsequently, the image processing device divides the computed histogram into a plurality of value regions including a dark portion (for example, 0 to 84 gradation levels), an intermediate portion (for example, 85 to 168 gradation levels), and a bright portion (for example, 169 to 255 gradation levels).

The image processing device computes the number of pixels of each divided value region and the number of pixels of the input image, respectively, computes a ratio or a magnitude relation of the number of pixels of each value region to the number of pixels of the input image, and computes the control point which specifies the shape of the correction curve for image correction based on the computed ratio or the computed magnitude relation of each value region (see part (3) of FIG. 1).

More specifically, the image processing device counts the number of pixels of the divided respective value regions of the dark portion, the intermediate portion, and the bright portion. The image processing device computes a ratio or a magnitude relation of the counted number of pixels of the respective value regions to the total number of pixels. Subsequently, the image processing device computes a flexion point (a control point), which is a change point of the correction curve, used for image correction, by using the computed ratio or the computed magnitude relation of the respective value regions of the dark portion, the intermediate portion, and the bright portion. Thereafter, the image processing device computes a final flexion point in which the computed flexion point is further limited to a correction amount within a predetermined range.

Subsequently, the image processing device computes the correction curve based on the computed control point and corrects the input image based on the computed correction curve (see part (4) of FIG. 1). More specifically, the image processing device computes the correction curve based on the computed flexion point in which the correction amount is limited. The image processing device corrects the input image by computing an output value from an input value based on the computed correction curve and outputs the corrected image.

As described above, the image processing device according to the first embodiment can compute the flexion point of the correction curve for correcting the gradation, by using the ratio of the number of pixels of each value region of a plurality of divided value regions, only based on brightness histogram information of the input image such as the moving image or the still image. Therefore, the image processing device according to the first embodiment can compute the control point of the correction curve, and through which stable and high-quality image correction can be performed without requiring the cost.

Configuration of Image Processing Device

Figures 2, 3:
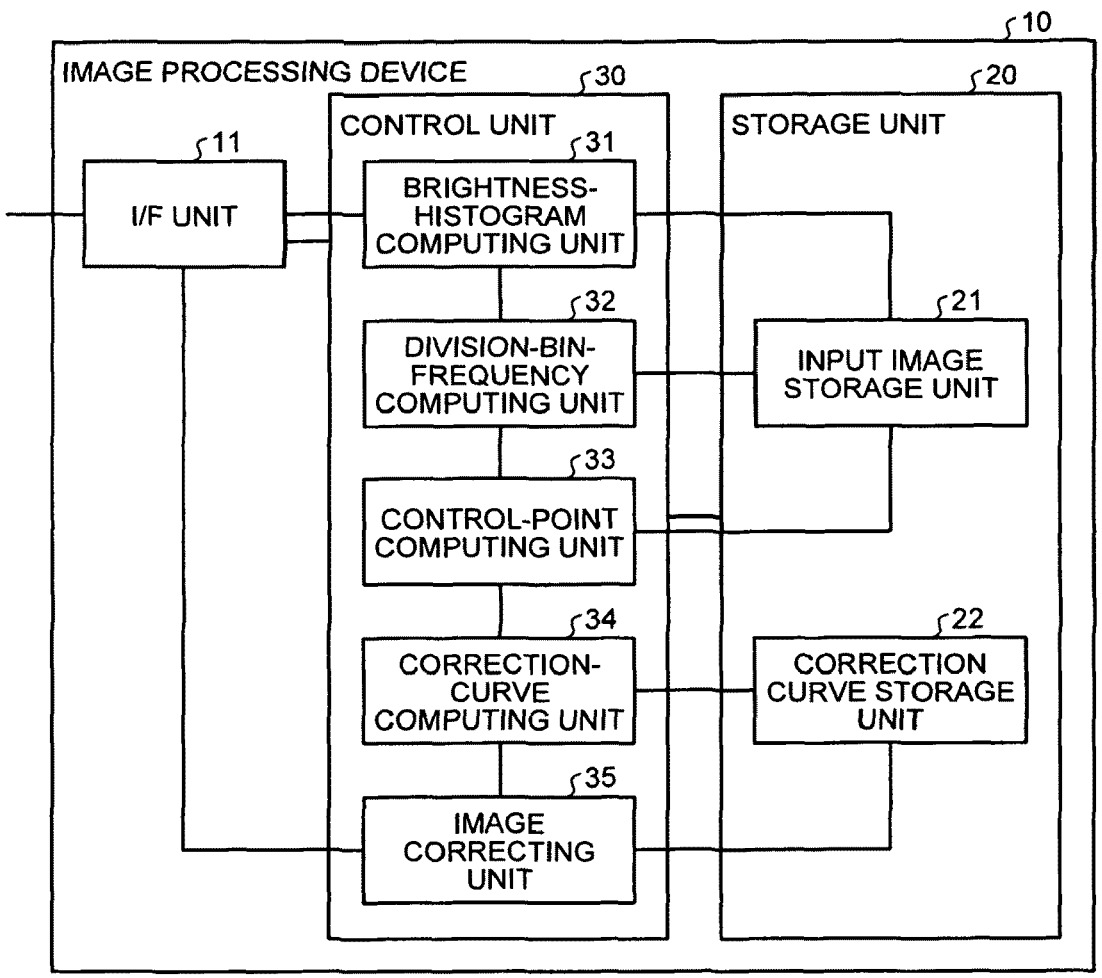
FIG. 2 is a block diagram illustrating a configuration of the image processing device according to the first embodiment.
FIG. 3 illustrates an equation for computing a vertical coordinate of a flexion point between a bright portion and an intermediate portion according to the first embodiment.

Next, a configuration of the image processing device according to the first embodiment is explained with reference to FIG. 2. FIG. 2 is a block diagram illustrating a configuration of the image processing device according to the first embodiment. As illustrated in FIG. 2, an image processing device 10 includes an I/F unit 11, a storage unit 20, and a control unit 30 and computes the control point of the correction curve used for image correction according to the input image which is input.

The I/F unit 11 receives the input image such as the moving image or the still image which is input from a different device connected to the image processing device 10 and inputs the input image to a brightness-histogram computing unit 31 which will be described later. The moving image or the still image may be input from a storage medium such as a compact disc-recordable (CD-R) as well as the connected different device.

The storage unit 20 stores data for various types of processing performed by the control unit 30 and results of various types of processing performed by the control unit 30. Specifically, in close connection with the present invention, the storage unit 20 includes an input image storage unit 21 and a correction curve storage unit 22.

Figures 9, 10:
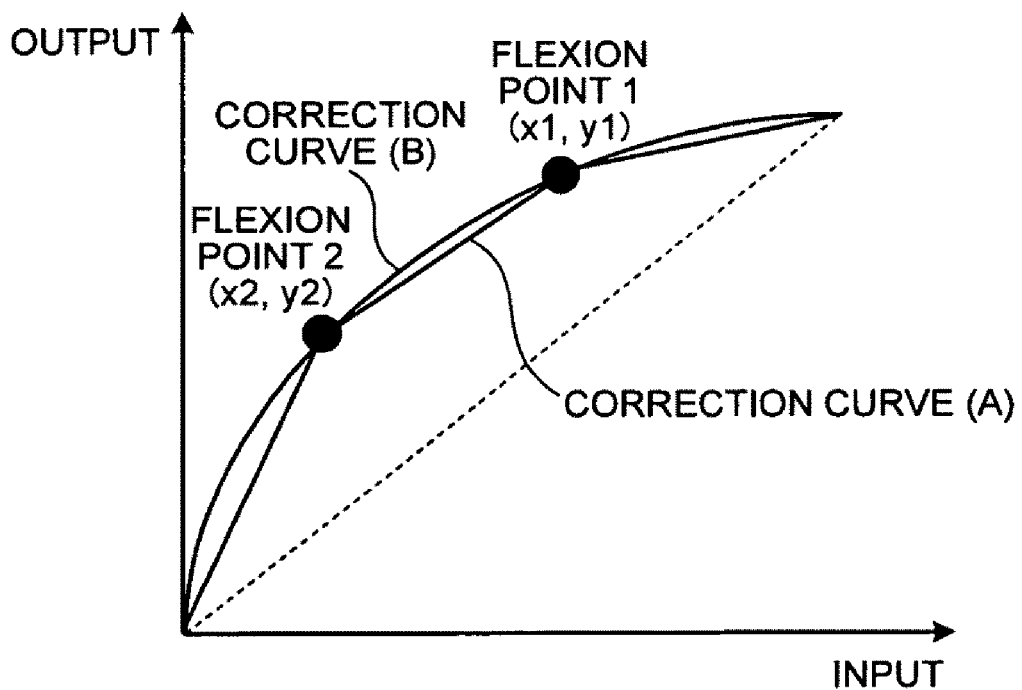
FIG. 9 illustrates equations for computing a correction curve according to the first embodiment.
FIG. 10 is a diagram illustrating examples of a correction curve according to the first embodiment.

The input image storage unit 21 stores the input image such as the moving image or the still image which is input to the image processing device 10. The correction curve storage unit 22 stores the correction curve, used for image correction, which is computed by a correction-curve computing unit 34 which will be described later (see FIG. 10). FIG. 10 is a view illustrating an example of the correction curve according to the first embodiment.

The control unit 30 includes an internal memory which stores a control program and a program and data for various processing procedures. Specifically, in close connection with the present invention, the control unit 30 includes the brightness-histogram computing unit 31, a division-bin-frequency computing unit 32, a control-point computing unit 33, the correction-curve computing unit 34, and an image correcting unit 35, and performs various types of processing by using the above-mentioned components.

The brightness-histogram computing unit 31 receives the input image and computes a brightness histogram of the image. More specifically, when the input image is received, the brightness-histogram computing unit 31 stores the image or a reduced image in the input image storage unit 21. The brightness-histogram computing unit 31 reads the image or the reduced image which is stored in the input image storage unit 21 and computes a Y component (a brightness component) of each pixel from RGB components by using a conversion equation such as "$Y=0.299 \times R+0.587 \times G+0.114 \times B$". Subsequently, the brightness-histogram computing unit 31 counts the frequency of the computed Y component and computes the brightness histogram of the image or the reduced image based on the Y value of each pixel.

The division-bin-frequency computing unit 32 divides the brightness histogram of the input image into a plurality of value regions according to gradation, computes the number of pixels of each divided value region and the number of pixels of the input image, respectively, and computes a ratio or a magnitude relation of the number of pixels of each value region to the number of pixels of the input image. Specifically, the division-bin-frequency computing unit 32 may be configured as a combination of a dividing unit which divides the brightness histogram of an input image into a plurality of value regions according to gradation and a ratio computing unit which computes the number of pixels of each value region divided by the dividing unit and the number of pixels of the input image, respectively, and computes a ratio or a magnitude relation of the number of pixels of each value region with respect to the number of pixels of the input image. To explain more specifically using the above-described example, the division-bin-frequency computing unit 32 divides the brightness histogram computed by the brightness-histogram computing unit 31 into a plurality of value regions including the dark portion (0 to 84 gradation levels), the intermediate portion (85 to 168 gradation levels), and the bright portion (169 to 255 gradation levels) according to the gradation. The division-bin-frequency computing unit 32 counts the number of pixels (for example, the dark portion "5", the intermediate portion "1", and the bright portion "4") of respective divided value regions of the dark portion, the intermediate portion, and the bright portion, and computes the ratio of the counted number to the total number of pixels by setting the total number as "10" (for example, the dark portion "5/10", the intermediate portion "1/10", and the bright portion "4/10").

The control-point computing unit 33 computes the control point which specifies the shape of the correction curve for image correction based on the computed ratio or the computed magnitude relation of each value region. More specifically, the control-point computing unit 33 computes a vertical coordinate "$255 \times (1-4/(2 \times 10))=204$" of the flexion point between the bright portion and the intermediate portion based on an equation of FIG. 3 by using the ratio of each value region of the dark portion, the intermediate portion, and the bright portion which is computed by the division-bin-frequency computing unit 32. Here, it is assumed that a horizontal coordinate of the flexion point between the bright portion and the intermediate portion is "$Th2=168$", and a weight W1 is "$W1=2$". The control-point computing unit 33 computes a vertical coordinate "$204-255 \times (1/(0.5 \times 10))=153$" of the flexion point between the intermediate portion and the dark portion based on an equation of FIG. 4 by using the computed flexion point (168,204) between the bright portion and the intermediate portion. Here, it is assumed that a horizontal coordinate of the flexion point between the intermediate portion and the dark portion is "Th1=84", and a weight W2 is "W2=0.5".

Figures 4, 5:
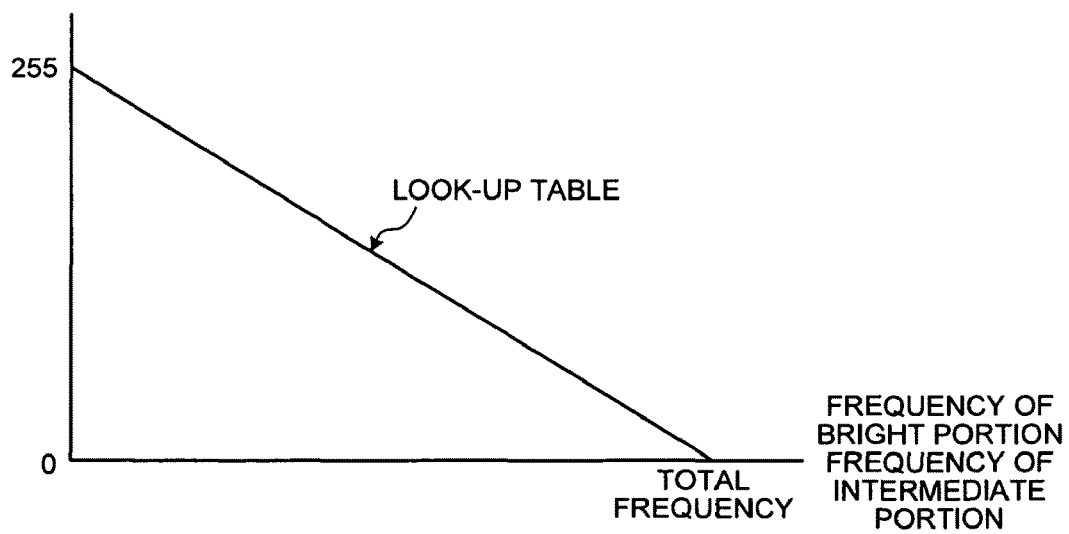
FIG. 4 illustrates an equation for computing a vertical coordinate of a flexion point between an intermediate portion and a dark portion according to the first embodiment.
FIG. 5 is a diagram illustrating an example of a look-up table which represents a magnitude relation of a frequency of luminance.

That is, the control-point computing unit 33 computes the flexion point (168,204) between the bright portion and the intermediate portion where the image turns brighter and computes the flexion point (84,153) between the intermediate portion and the dark portion where the image turns darker by using the computed flexion point where the image turns bright. Therefore, when correcting an image which is generally dark, like a backlit image, it is possible to perform correction of a dark portion while reflecting a correction value of a bright portion. FIG. 3 illustrates an example of an equation for computing the vertical coordinate of the flexion point between the bright portion and the intermediate portion according to the first embodiment, and FIG. 4 illustrates an example of an equation for computing the vertical coordinate of the flexion point between the intermediate portion and the dark portion according to the first embodiment.

Computation of a control point (flexion point) utilizing the magnitude relations among the bright portion, the intermediate portion, and the dark portion is explained above as an example of computation of the control point which specifies the shape of the correction curve. Specifically, in the above, the computation based on the ratio of each value region is explained. However, the control point may be computed based on the magnitude relation of the frequency of luminance which is previously stored. Specifically, the control-point computing unit 33 computes the control point based on a look-up table (LUT) which represents the magnitude relation of the bright portion frequency, the intermediate portion frequency, and the total frequency which are previously stored as illustrated in FIG. 5. FIG. 5 is a graph illustrating an example of a look-up table representing the magnitude relation of the frequency of luminance.

Computation of the control point using the LUT may be performed, for example, by using equations of parts (A) and (B) of FIG. 6. In the computation equations of the control point using the LUT, similarly to the examples of the computation equations of FIGS. 3 and 4, the control point between the bright portion and the intermediate portion is first computed, and then the control point between the intermediate portion and the dark portion is computed by using the computation result of the control point between the bright portion and the intermediate portion. FIG. 6 illustrates an example of an equation used when computing the control point based on the look-up table.

Subsequently, the control-point computing unit 33 further limits the computed flexion point to within a predetermined range. More specifically, the control-point computing unit 33 computes the correction amounts "204−168=36" and "153−84=69" based on an equation of FIG. 7 by using the computed flexion points (168,204) and (84,153). The control-point computing unit 33 computes the correction amount of the flexion point based on limitation illustrated FIG. 8.

That is, the control-point computing unit 33 uses Th5 as the correction amount when a change range "36" or "69" with respect to the computed flexion point is equal to or less than Th5, "36" or "69" as the correction amount when the change range "36" or "69" is between Th5 and Th6, and Th6 as the correction amount when the change range "36" or "69" is equal to or more than Th6, and computes the final flexion points (84,84+Th5), (84,153), or (84,84+Th6) and (168,168+Th5), (168,204), or (168,168+Th6). As a result, the control-point computing unit 33 computes the flexion point for correcting an image in a bright direction in which the change range of the flexion point is adjusted to "Th5" at minimum and "Th6" at maximum. Thus, even in the case of correcting the dark image such as the backlit image, it is possible to compute control point of the correction curve for performing stable and high-quality image correction in which correction for darkening the dark portion more than necessary or correction for brightening the bright portion more than necessary is not performed. FIG. 7 illustrates an example of an equation for computing the correction amount of the flexion point according to the first embodiment, and FIG. 8 is a view for explaining a case of limiting the correction amount of the flexion point according to the first embodiment.

Thereafter, the correction-curve computing unit 34 computes the correction curve based on the flexion point computed by the control-point computing unit 33. More specifically, the correction-curve computing unit 34 computes a correction curve (A) indicated by a straight line by using an equation illustrated in part (A) of FIG. 9 based on a flexion point 1 (x1,y1) computed from the bright portion and the intermediate portion and a flexion point 2 (x2, y2) computed from the intermediate portion and the dark portion in which the correction amount is limited by the control-point computing unit 33 as illustrated in FIG. 10.

The correction-curve computing unit 34 may compute a correction curve (B) indicated by a curve line by using an equation illustrated in part (B) of FIG. 9 based on the flexion point 1 (x1,y1) computed from the bright portion and the intermediate portion and the flexion point 2 (x2,y2) computed from the intermediate portion and the dark portion in which the correction amount is limited by the control-point computing unit 33 as illustrated in FIG. 10. FIG. 9 illustrates examples of an equation for computing the correction curve according to the first embodiment, and FIG. 10 is a graph illustrating examples of the correction curve according to the first embodiment.

The image correcting unit 35 corrects the input image based on the correction curve computed by the correction-curve computing unit 34. More specifically, the image correcting unit 35 performs correction of a received image or a reduced image based on the correction curve (A) or the correction curve (B) computed by the correction-curve computing unit 34. In the image correction, the Y component of the image may be processed based on the correction curve, and then the result may be reversely converted into the RGB component. Alternatively, the RGB component may be processed as it is based on the correction curve.

Processing by Image Processing Device According to First Embodiment

Figure 11:
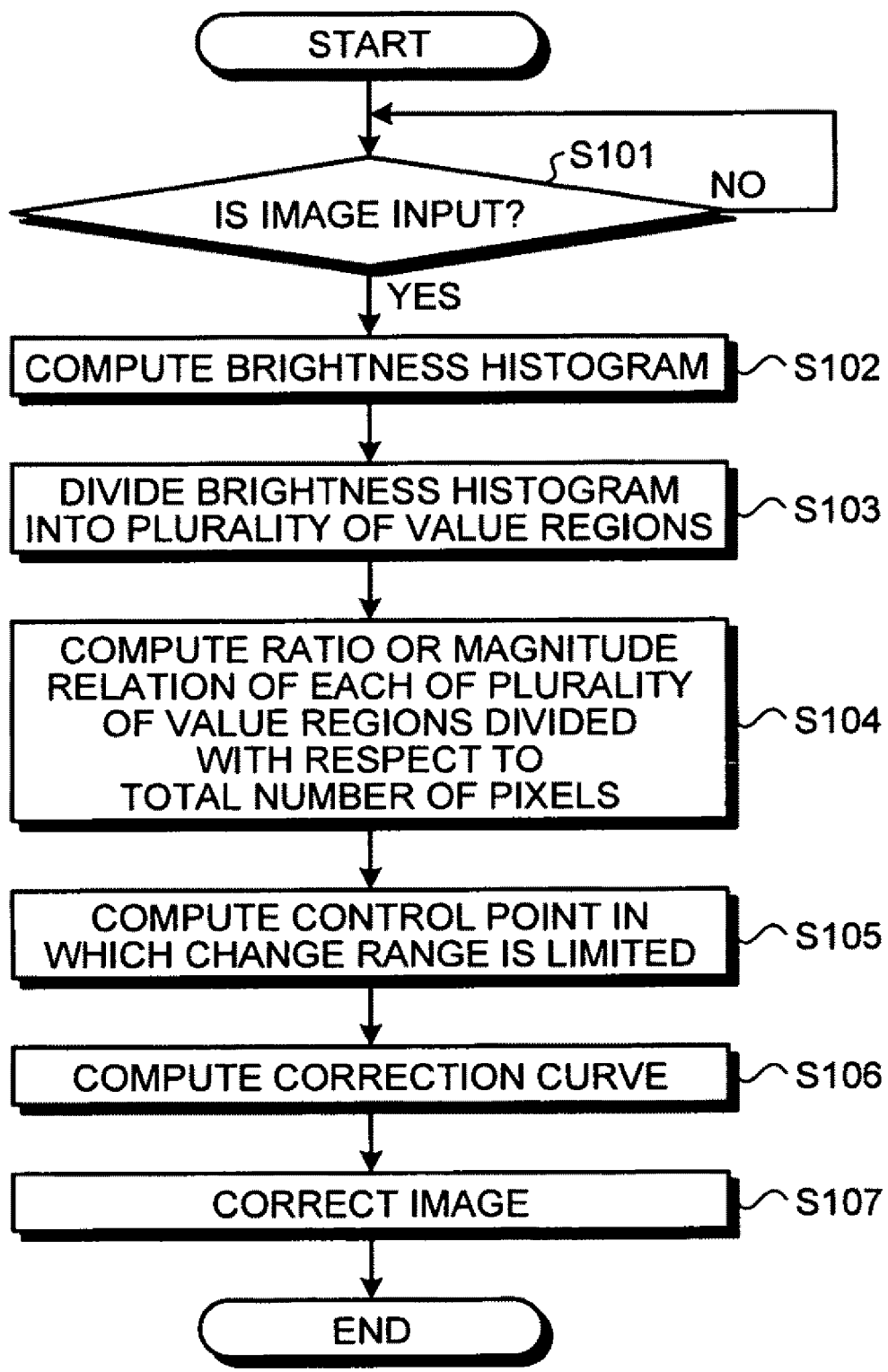
FIG. 11 is a flowchart illustrating processing by the image processing device according to the first embodiment.

Next, processing by the image processing device 10 according to the first embodiment is explained with reference to FIG. 11. FIG. 11 is a flowchart illustrating processing by the image processing device 10 according to the first embodiment.

As illustrated in FIG. 11, when an image is input to the image processing device 10 (Yes at step S101), the image processing device 10 reads the image or the reduced image to compute the Y component of each pixel from the RGB components, counts the frequency of the computed Y component, and computes the brightness histogram of the image or the reduced image based on the Y value of each pixel (step S102).

The image processing device 10 divides the computed brightness histogram into a plurality of value regions including the dark portion, the intermediate portion, and the bright portion according to the gradation (step S103). The image processing device 10 counts the number of pixels of each divided value region of the dark portion, the intermediate portion, and the bright portion and computes the ratio or the magnitude relation of the number of pixels of each value region to the total number of pixels (step S104).

Subsequently, the image processing device 10 computes the flexion points between the bright portion and the intermediate portion and between the intermediate portion and the dark portion while reflecting the correction value of a portion which appears to be bright by using the computed ratio or the computed magnitude relation of each value region of the dark portion, the intermediate portion, and the bright portion, and computes the flexion points by limiting the change range of the computed flexion points (step S105).

Thereafter, the image processing device 10 computes the correction curve based on the computed flexion point (step S106). The image processing device 10 performs correction of the input image or the reduced image based on the computed correction curve (step S107). Specifically, the correction curve is generated as a "broken line" by connecting the control points with a straight line, but a curve line such as a "spline" may be used.

Effects According to First Embodiment

As described above, the image processing device 10 computes the control point which specifies the shape of the correction curve in which the change range is limited and which is used for correcting the image based on information of the brightness histogram of the input image which is input. Therefore, it is possible to compute the control point of the correction curve through which stable and high-quality image correction can be performed without requiring the cost.

For example, the image processing device 10 computes the brightness histogram of the input image and divides the brightness histogram into a plurality of value regions including the dark portion, the intermediate portion, and the bright portion according to the gradation. Then, the image processing device 10 computes the ratio or the magnitude relation of the number of pixels in each divided value region to the total number of pixels. Subsequently, the image processing device 10 computes the control points (the flexion points) between the bright portion and the intermediate portion and between the intermediate portion and the dark portion while limiting the correction amount by using the computed ratio or the computed magnitude relation of the respective value regions. Thereafter, the image processing device 10 computes the correction curve by using the computed control points and performs correction of the input image which is input based on the computed correction curve. That is, the image processing device 10 can compute the control point in which the correction amount is limited only from information obtained from the brightness histogram. Therefore, it is possible to compute the control point of the correction curve through which stable and high-quality image correction can be performed without requiring the cost.

[b] Second Embodiment

In the first embodiment, the case of computing the flexion point in which the change range is limited by using a predetermined fixed value such as "Th5" or "Th6" has been explained, but the present invention is not limited thereto. It is also possible to store the flexion point correction amount curve in a predetermined storage unit in advance and compute the flexion point by using the flexion point correction amount curve.

Figure 12:
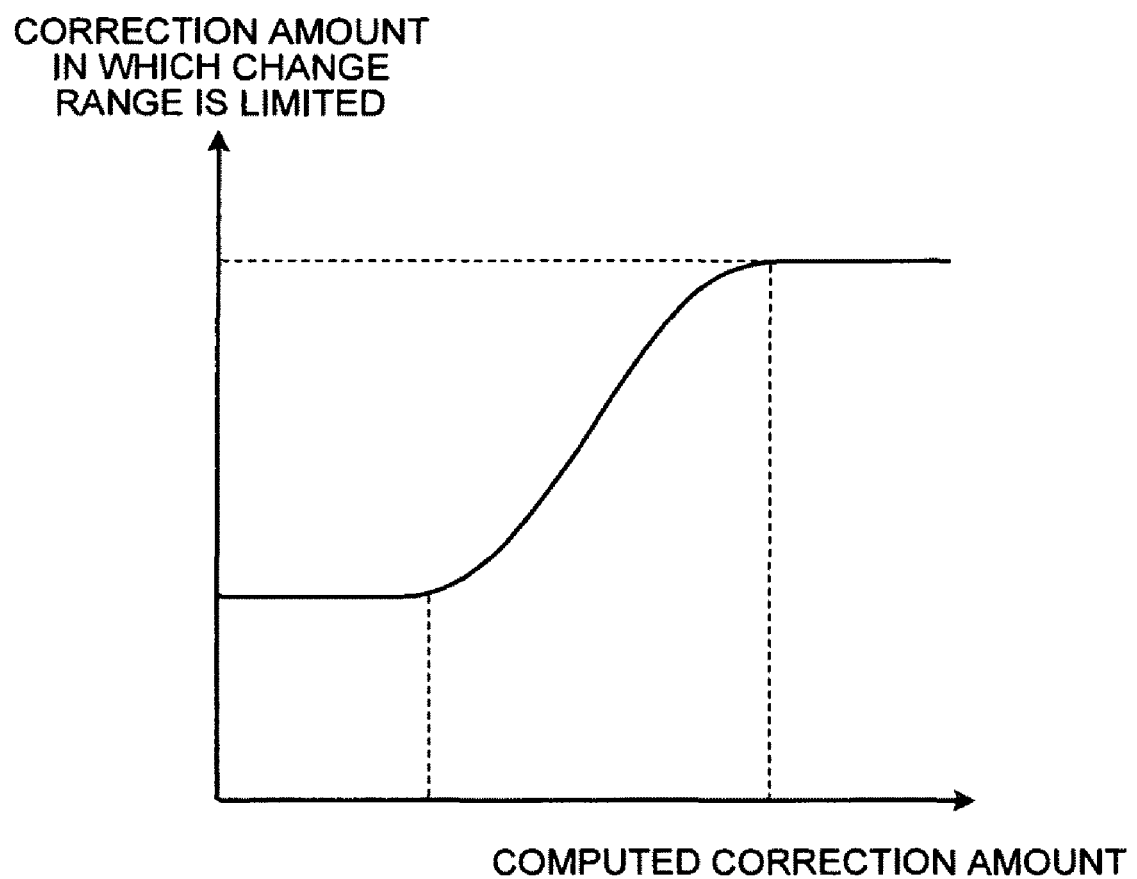
FIG. 12 is a diagram for explaining processing for computing a flexion point in which a change range is limited according to a second embodiment.

Processing of Computing Flexion Point in which Change Range is Limited According to Second Embodiment In the second embodiment below, processing of computing the flexion point in which the change range is limited by an image processing device 10 according to the second embodiment is explained with reference to FIG. 12. FIG. 12 is a graph for explaining processing of computing the flexion point in which the change range is limited according to the second embodiment. Processing except processing of computing the flexion point in which the change range is limited is similar to processing according to the first embodiment, and thus description thereof will not be repeated. Here, processing of computing the flexion point in which the change range is limited is explained.

Unlike the first embodiment, a flexion point correction amount curve which represents the correction amount in which the change range is limited is stored corresponding to the correction amount. Specifically, as illustrated in FIG. 12, a final flexion point is computed by using the flexion point correction amount curve in which a fixed value is not determined in advance while limiting the change range of the correction amount computed by the equation of FIG. 7.

Effects According to Second Embodiment

As described above, the image processing device 10 stores the flexion point correction amount curve which represents the correction amount in which the change range is limited corresponding to the correction amount of the flexion point and computes the final flexion point based on the computed correction amount. Therefore, it is possible to compute the correction amount of the flexion point with higher degree of accuracy and compute the flexion point of the correction curve for performing high-quality image correction.

[c] Third Embodiment

In the first embodiment, the case of dividing the brightness histogram into the dark portion, the intermediate portion, and the bright portion according to the gradation and computing the flexion point has been explained. However, the present invention is not limited thereto. It is also possible to further finely divide the dark portion and the bright portion and compute the flexion point.

Figure 13:
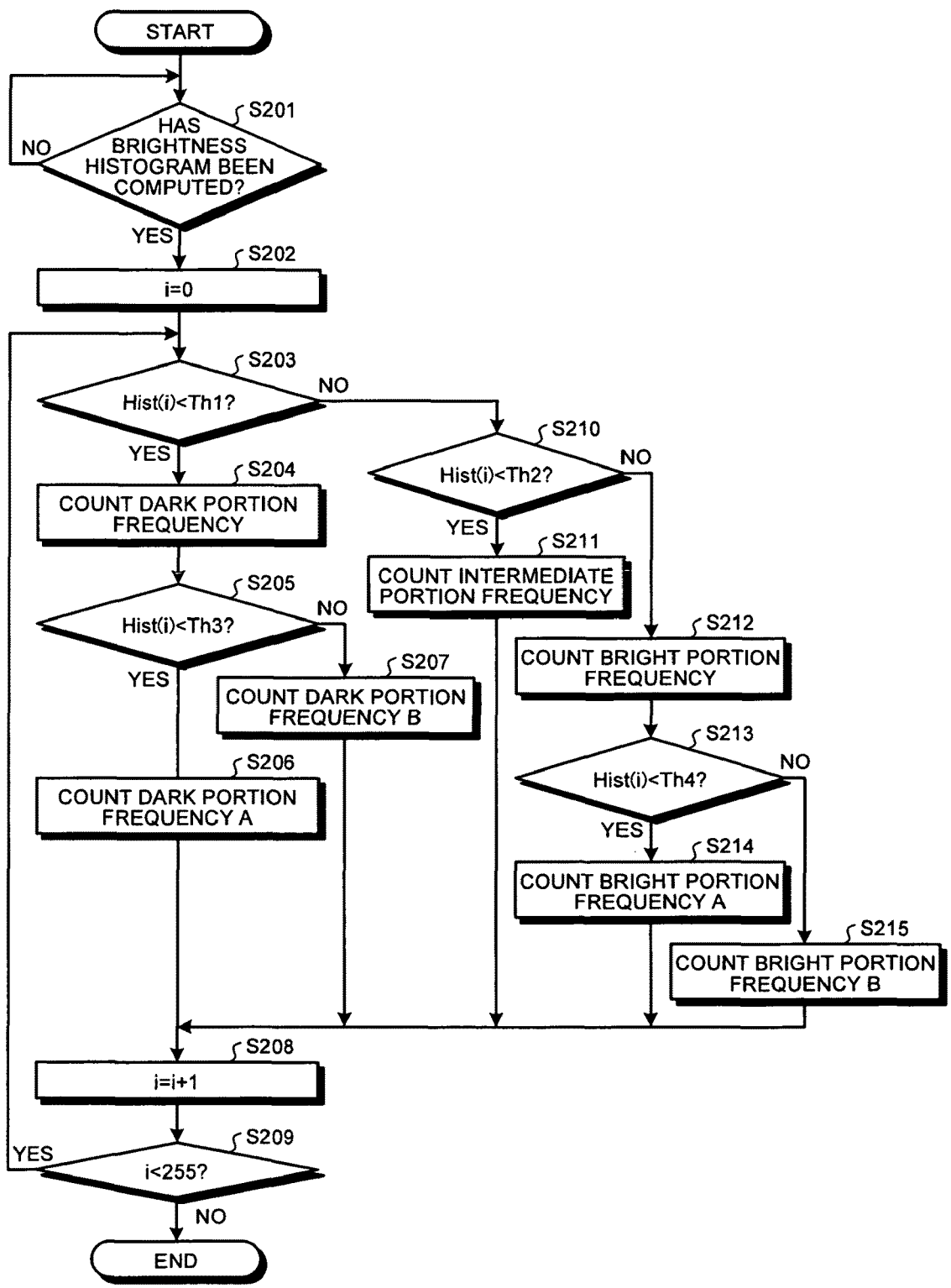
FIG. 13 is a flowchart for explaining processing by a division-bin-frequency computing unit when a dark portion and a bright portion are subdivided according to a third embodiment.
Figure 14:
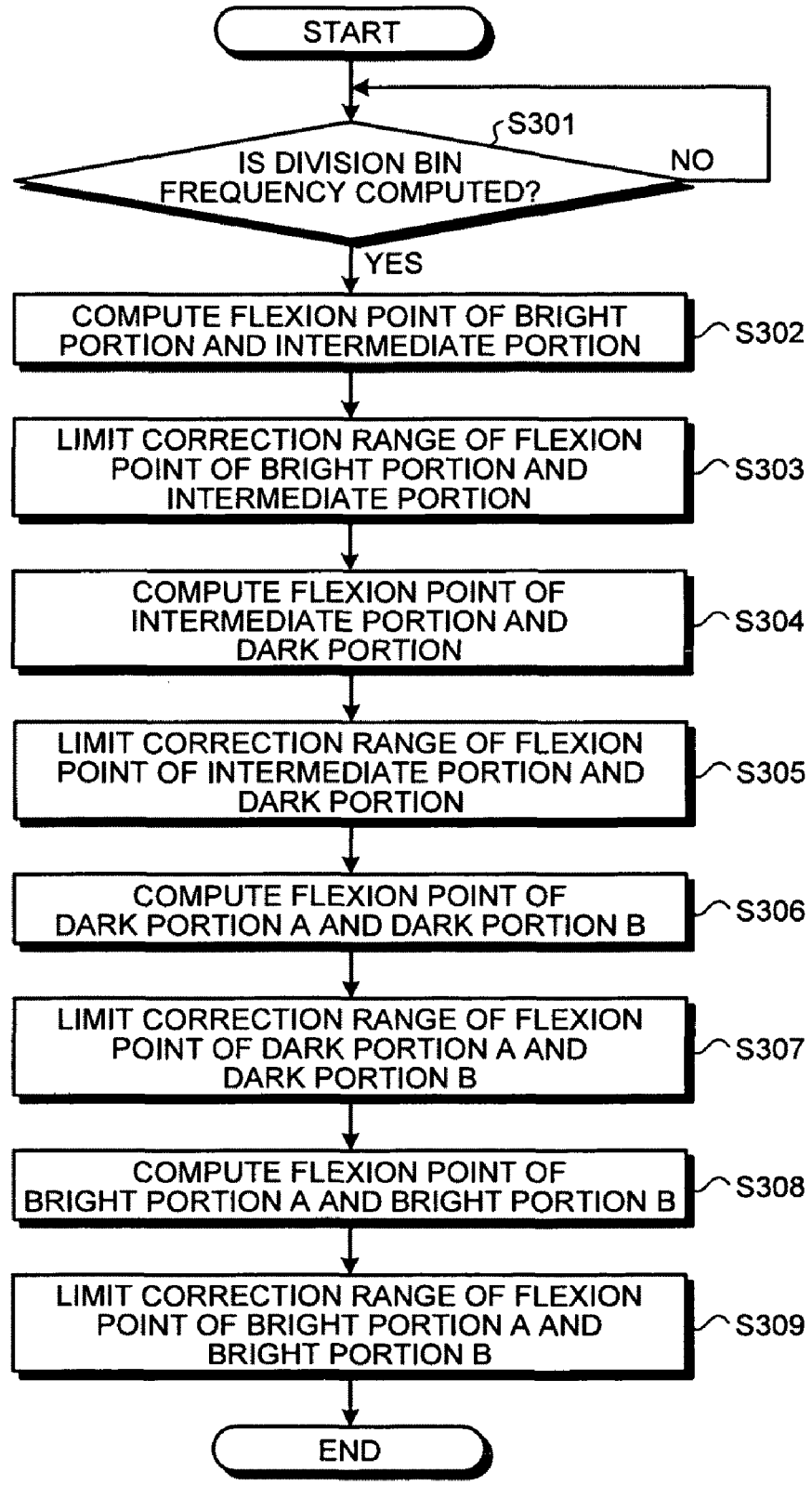
FIG. 14 is a flowchart for explaining processing by a control-point computing unit when a dark portion and a bright portion are subdivided according to the third embodiment.

Processing by Division-Bin-Frequency Computing Unit According to Third Embodiment In the third embodiment below, processing by an image processing device 10 according to the third embodiment is explained with reference to FIGS. 13 and 14. FIG. 13 is a flowchart for explaining processing by the division-bin-frequency computing unit 32 when the dark portion and the bright portion are subdivided according to the third embodiment, and FIG. 14 is a flowchart for explaining processing by the control-point computing unit 33 when the dark portion and the bright portion are subdivided according to the third embodiment.

A variable "i" used in FIG. 13 represents a gradation levels of 0 to 255, and "Hist(i)" represents a gradation value of each pixel of a processed brightness histogram. Predetermined values "Th1 to Th4" used in FIG. 13 are values of, for example, "Th1=84", "Th2=168", "Th3=42", and "Th4=212". A configuration and partial functions of the image processing device according to the third embodiment are similar to those according to the first embodiment, and thus description thereof will not be repeated. Here, processing by the division-bin-frequency computing unit 32 and the control-point computing unit 33 which is different from the first embodiment is explained.

As illustrated in FIG. 13, when the brightness histogram of the input image is computed by the brightness-histogram computing unit 31 (Yes at step S201), the division-bin-frequency computing unit 32 sets the variable "i" to "i=0" (step S202). The division-bin-frequency computing unit 32 compares the gradation value "Hist(i)" of the pixel of the brightness histogram with the predetermined value "Th1" (step S203).

When the gradation value "Hist(i)=30" of the pixel of the brightness histogram is smaller than the predetermined value "Th1=84" (Yes at step S203), the division-bin-frequency computing unit 32 counts the pixel as the dark portion frequency (step S204).

Subsequently, when the gradation value "Hist(i)=30" of the pixel of the brightness histogram is smaller than the predetermined value "Th3=42" (Yes at step S205), the division-bin-frequency computing unit 32 counts the pixel as the dark portion frequency A (step S206). When the gradation value "Hist(i)=50" of the pixel of the brightness histogram is equal to or more than the predetermined value "Th3=42" (No at step S205), the division-bin-frequency computing unit 32 counts the pixel as the dark portion frequency B (step S207).

Thereafter, the division-bin-frequency computing unit 32 sets the variable i to "i=i+1" (step S208). The division-bin-frequency computing unit 32 finishes processing when the variable i is equal to or more than "255" (No at step S209). The division-bin-frequency computing unit 32 performs processing of step S203 when the variable i is smaller than "255" (Yes at step S209).

When it is determined in step S203 that the gradation value "Hist(i)=90" of the pixel of the brightness histogram is equal to or more than the predetermined value "Th1=84" (No at step S203), the division-bin-frequency computing unit 32 compares the gradation value "Hist(i)" of the pixel of the brightness histogram with the predetermined value "Th2" (step S210).

When the gradation value "Hist(i)=100" of the pixel of the brightness histogram is smaller than the predetermined value "Th2=168" (Yes at step S210), the division-bin-frequency computing unit 32 counts the pixel as the intermediate frequency (step S211) and then performs processing of step S208.

When it is determined in step S210 that the gradation value "Hist(i)=200" of the pixel of the brightness histogram is equal to or more than the predetermined value "Th2=168" (No at step S210), the division-bin-frequency computing unit 32 counts the pixel as the bright portion frequency (step S212).

When the gradation value "Hist(i)=200" of the pixel of the brightness histogram is smaller than the predetermined value "Th4=212" (Yes at step S213), the division-bin-frequency computing unit 32 counts the pixel as the bright portion frequency A (step S214). However, when the gradation value "Hist(i)=230" of the pixel of the brightness histogram is smaller than the predetermined value "Th4=212" (No at step S213), the division-bin-frequency computing unit 32 counts the pixel as the bright portion frequency B (step S215) and then performs processing of step S208.

When the gradation values of all pixels are counted, the division-bin-frequency computing unit 32 performs the same processing as the first embodiment to compute the ratio of the number of pixels of each value region to the number of pixels of the input image. That is, the division-bin-frequency computing unit 32 computes the ratio of the number of pixels of the dark portion A, the dark portion B, the intermediate portion, the bright portion A, and the bright portion B with respect to the pixels of the input image.

Processing by Control-Point Computing Unit According to Third Embodiment

Next, processing by the control-point computing unit 33 according to the third embodiment is explained. As illustrated in FIG. 14, when the ratio of the number of pixels of each value region is computed by the division-bin-frequency computing unit 32 (Yes at step S301), the control-point computing unit 33 performs the same processing as the first embodiment to compute the flexion point in which the change range of the bright portion and the intermediate portion is limited (steps S302 and S303).

The control-point computing unit 33 computes the flexion point in which the change range of the intermediate portion and the dark portion is limited (steps S304 and S305). Subsequently, the control-point computing unit 33 computes the flexion point in which the change range of the dark portion A and the dark portion B is limited based on the flexion point in which the change range of the intermediate portion and the dark portion is limited (steps S306 and S307). Thereafter, the control-point computing unit 33 computes the flexion point in which the change range of the bright portion A and the bright portion B is limited based on the flexion point in which the change range of the bright portion and the intermediate portion is limited (steps S308 and S309).

Effects According to Third Embodiment

As described above, the image processing device 10 further finely divides the dark portion and the bright portion based on the gradation value of the pixel which is input, computes the ratio of each divided value region with respect to the number of pixels of the input image, and computes the flexion point in which the change range is limited based on the computed ratio of each value region. Thus, it is possible to compute the flexion point of the correction curve for performing higher-quality image correction.

[d] Fourth Embodiment

The embodiments of the present invention have been described hereinbefore, but the present invention may be implemented in various different forms as well as the above-described embodiments. Another embodiment for (1) computation of the correction amount by linear interpolation, (2) a system configuration, and (3) a program is explained.

(1) Computation of the Correction Amount by Linear Interpolation

In the first to third embodiments described above, the cases of computing the correction curve based on the computed flexion point and correcting the input image based on the computed correction curve have been explained, but the present invention is not limited thereto. According to the present invention, the correction amount can be computed by linearly interpolating each computed flexion point.

Figure 15:
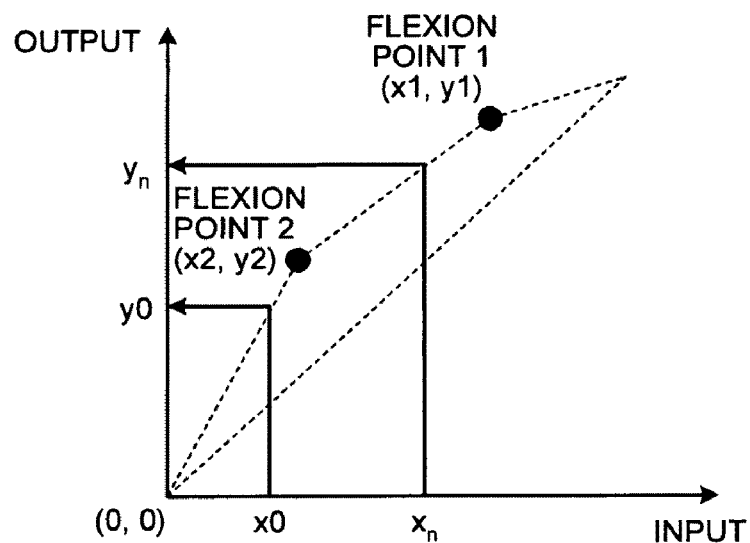
FIG. 15 is a diagram for explaining processing of computing a correction amount from a flexion point by using linear interpolation.

For example, as illustrated in FIG. 15, when a flexion point 1 (x1,y1) and a flexion point 2 (x2,y2) are computed, the image processing device 10 linearly interpolates a point (x0, y0) located between an original point (0,0) and the flexion point 1 and a point (xn,yn) located between the flexion point 1 and the flexion point 2 and computes respective output values "y0" and "yn" from respective input values "x0" and "xn". Then, the image processing device 10 performs image correction processing by using the respective output values as the correction amount of the input image. That is, when the flexion point of the correction curve for image correction is computed, the image processing device 10 does not compute the correction curve for image correction but performs image correction. Therefore, it is possible to perform image correction processing in which a processing load is reduced. FIG. 15 is a graph for explaining processing of computing the correction amount from the flexion point by linear interpolation.

(2) A System Configuration

A processing procedure, a control procedure, a specific name, and information including various data or parameters (for example, information such as the correction curve stored in the correction curve storage unit 22 illustrated in FIG. 2) which are explained in the above description or illustrated in the drawings can be arbitrarily changed unless specially mentioned.

Each component of each device illustrated in the drawings is functional and conceptual and does not need to necessarily have a physical configuration as illustrated in the drawings. That is, a specific form of division and integration of each device is not limited to one illustrated in the drawings. For example, the brightness-histogram computing unit 31 may be divided into an image receiving unit which receives the input image and stores the input image in the input image storage unit 21 and a brightness-histogram computing unit which computes the brightness histogram. That is, each device can be configured by functionally or physically dividing or integrating the whole or a part thereof in arbitrary units depending on various loads or use states. Further, all or a part of various processing functions performed in each device may be implemented by a central processing unit (CPU) and a program which is executed by the CPU or implemented as hardware by a wired logic.

(3) A Program

Figure 16:
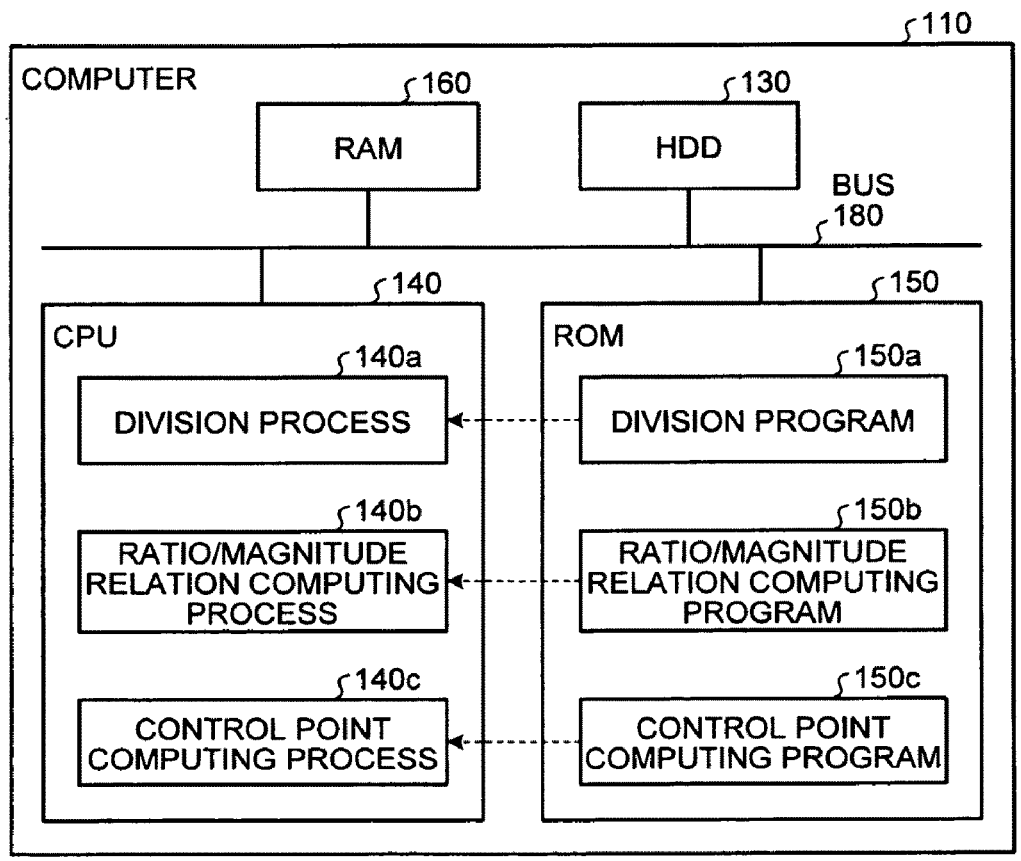
FIG. 16 is a diagram illustrating a computer which executes an image processing program.
Figure 17:
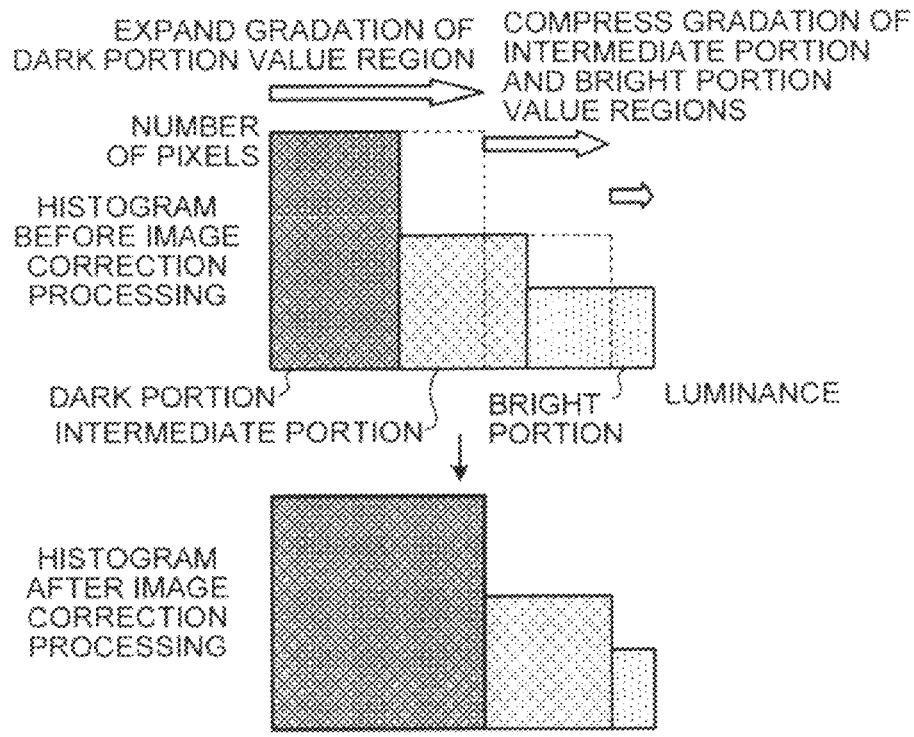
FIG. 17 is a diagram for explaining histogram equalization in image correction according to a conventional technology.
Figure 18:
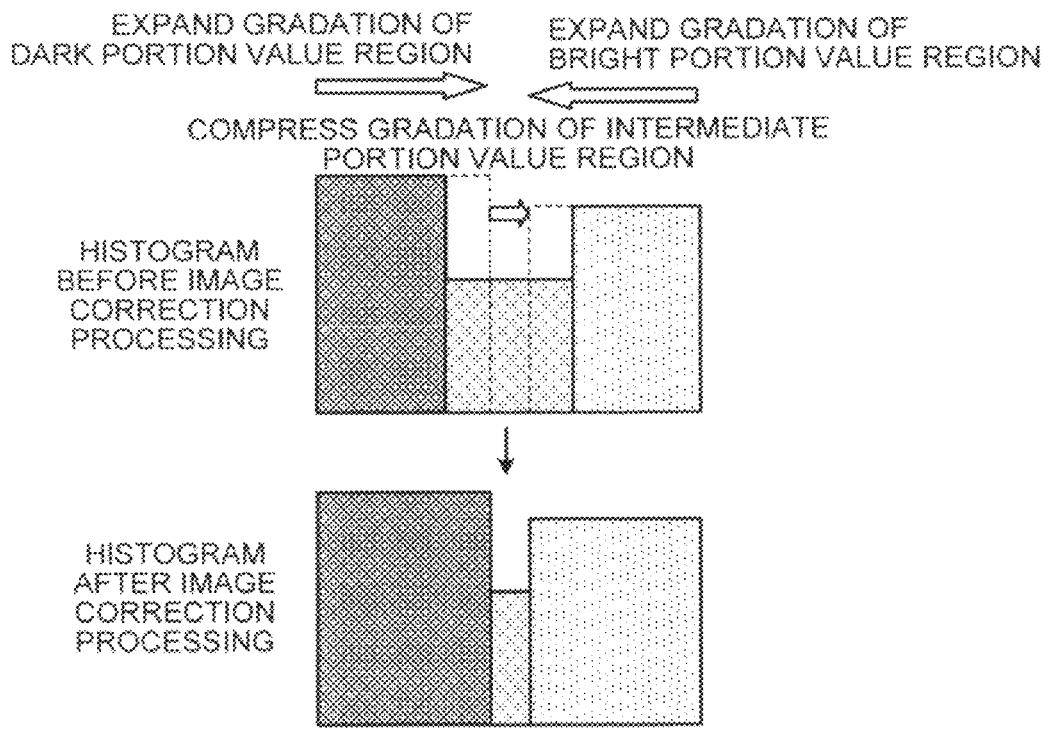
FIG. 18 is a diagram for explaining histogram equalization in image correction according to a conventional technology.
Figure 19:
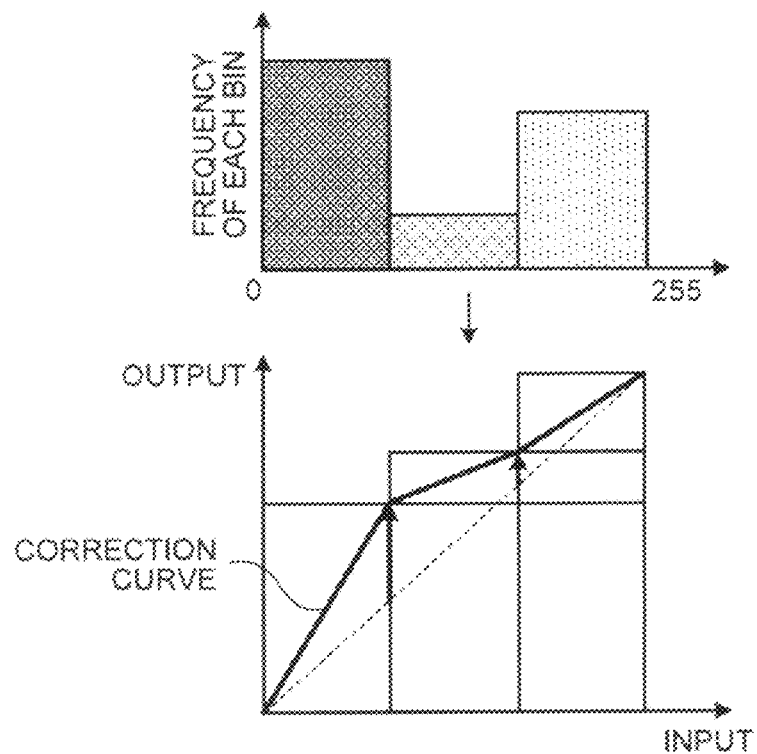
FIG. 19 is a diagram for explaining image correction processing by histogram equalization according to a conventional technology.
Figure 20:
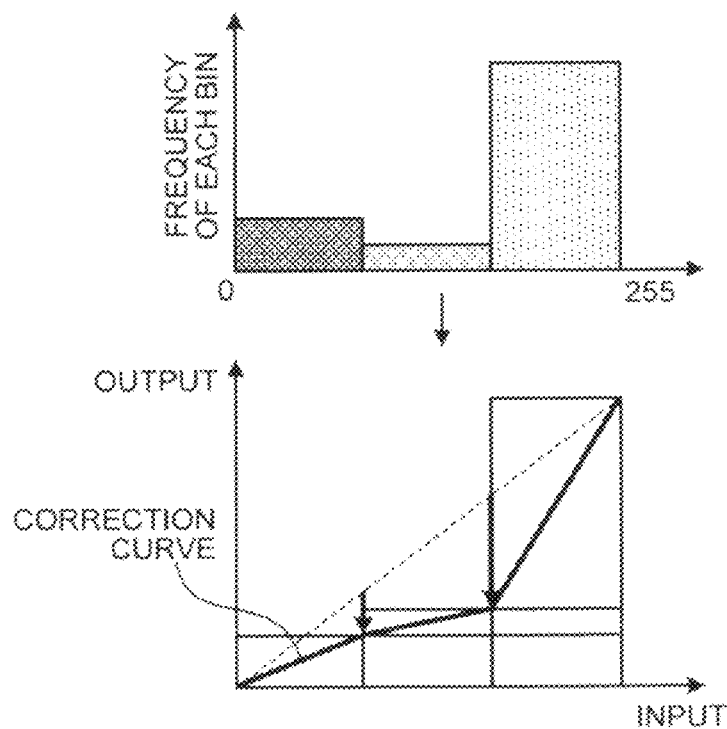
FIG. 20 is a diagram for explaining image correction processing by histogram equalization according to a conventional technology.

The image processing device explained in the present embodiment may be implemented by executing a previously prepared program through a computer such as a personal computer or a workstation. An example of a computer which executes an image processing program having the same function as the image processing device of the above-described embodiments is explained below with reference to FIG. 16. FIG. 16 is a view illustrating a computer which executes an image processing program.

As illustrated in FIG. 16, a computer 110 as an image processing device includes a hard disk drive (HDD) 130, a CPU 140, a read only memory (ROM) 150, and a random access memory (RAM) 160 which are connected through a bus 180.

An image processing program which performs the same function as the image processing device 10 explained in the first embodiment, that is, a division program 150*a*, a ratio/magnitude relation computing program 150*b*, and a control point computing program 150*c* are previously stored in the ROM 150 as illustrated in FIG. 16. The programs 150*a* to 150*c* may be appropriately integrated or divided similarly to each component of the image processing device 10 illustrated in FIG. 2.

The CPU 140 reads out the programs 150*a* to 150*c* from the ROM 150 and executes the programs 150*a* to 150*c*. Thus, as illustrated in FIG. 16, the programs 150*a* to 150*c* function as a division process 140*a*, a ratio/magnitude relation computing process 140*b*, and a control point computing process 140*c*. The processes 140*a* to 140*c* correspond to the brightness-histogram computing unit 31, the division-bin-frequency computing unit 32, and the control-point computing unit 33 which are illustrated in FIG. 2, respectively.

The CPU 140 executes the image processing program based on data recorded in the RAM 160.

The respective programs 150*a* to 150*c* do not need to be necessarily stored in the ROM 150 from the beginning. For example, each program may be stored in "a portable physical medium" such as a flexible disk (FD), a CD-ROM, a DVD disk, an optical magnetic disk, and an integrated circuit (IC) card which are inserted into the computer 110, "a fixed physical medium" such as a HDD provided inside and outside the computer 110, or "a different computer (or a server)" connected to the computer 110 through a public line, the Internet, a local area network (LAN), and a wide area network (WAN). The computer 110 may read out each program therefrom and execute each program.

According to an embodiment, the control point which specifies the shape of the correction curve in which the correction amount is limited can be computed only from information obtained from the brightness histogram. Thus, there is an effect that the correction curve can be computed, and through which stable and high-quality image correction can be performed without requiring the cost.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device comprising:
   a dividing unit which divides a brightness histogram of an input image into a plurality of value regions including a dark portion, an intermediate portion, and a bright portion according to gradation;
   a ratio computing unit which computes the number of pixels of each value region divided by the dividing unit and the number of pixels of the input image, respectively, and computes a ratio of the number of pixels of each value region with respect to the number of pixels of the input image; and
   a control-point computing unit which computes a first control point between the bright portion and the intermediate portion and a second control point between the intermediate portion and the dark portion, which specify a shape of a correction curve for image correction according to a feature of the input image, the control-point computing unit computing the first control point based on the ratio of the bright portion, and the control-point computing unit computing the second control point based on the ratio of the intermediate portion and the first control point, and further limits the first control point and the second control point to within a predetermined range.

2. The image processing device according to claim 1, wherein the dividing unit divides the brightness histogram of the input image into a plurality of value regions including a dark portion, an intermediate portion, and a bright portion and subdivides the dark portion and the bright portion into a plurality of value regions.

3. An image correction device which corrects an image according to a feature of an input image, comprising:
   a dividing unit which divides a brightness histogram of the input image into a plurality of value regions including a dark portion, an intermediate portion, and a bright portion according to gradation;
   a ratio computing unit which computes the number of pixels of each value region divided by the dividing unit and the number of pixels of the input image, respectively, and computes a ratio of the number of pixels of each value region with respect to the number of pixels of the input image;
   a control-point computing unit which computes the first control point between the bright portion and the intermediate portion and a second control point between the intermediate portion and the dark portion, which specify a shape of a correction curve for image, the control-point computing unit computing the first control point based on the ratio of the bright portion, and the control-point computing unit computing the second control point based on the ratio of the intermediate portion and the first control point, and further limits the first control point and the second control point to within a predetermined range a correction-curve computing unit which computes a correction curve based on the first and the second control point computed by the control-point computing unit; and an image correcting unit which corrects the input image based on the correction curve computed by the correction-curve computing unit.

4. A non-transitory computer readable storage medium having stored therein an image processing program, the image processing program causing a computer as an image processing device to execute a process comprising:

dividing a brightness histogram of an input image into a plurality of value regions including a dark portion, an intermediate portion, and a bright portion according to gradation;

firstly computing the number of pixels of each value region divided in the dividing and the number of pixels of the input image, respectively, and computing a ratio of the number of pixels of each value region with respect to the number of pixels of the input image; and secondly computing a first control point between the bright portion and the intermediate portion and a second control point between the intermediate portion and the dark portion, which specify a shape of a correction curve for image correction according to a feature of the input image, and further limiting the first control point and the second control point to within a predetermined range, the secondly computing includes computing the first control point based on the ratio of the bright portion, and the control-point computing unit computing the second control point based on the ratio of the intermediate portion and the first control point.

5. The image processing device according to claim 1, wherein the control-point computing unit limits the first control point and the second control point to within a predetermined range by computing each correction amounts for the first control point and the second control point, and adding the computed correction amount when the computed correction amount is with in a predetermined range or adding a maximum amount of the predetermined range when the computed correction amount is equal to or more than the maximum amount or adding a minimum amount of the predetermined range when the computed correction amount is equal to or less than the minimum amount.

6. A digital camera comprising an image processing device which includes:

a dividing unit which divides a brightness histogram of an input image into a plurality of value regions including a dark portion, an intermediate portion, and a bright portion according to gradation;

a ratio computing unit which computes the number of pixels of each value region divided by the dividing unit and the number of pixels of the input image, respectively, and computes a ratio of the number of pixels of each value region with respect to the number of pixels of the input image; and a control-point computing unit which computes a first control point between the bright portion and the intermediate portion and a second control point between the intermediate portion and the dark portion, which specify a shape of a correction curve for image correction according to a feature of the input image, the control-point computing unit computing the first control point based on the ratio of the bright portion, and the control-point computing unit computing the second control point based on the ratio of the intermediate portion and the first control point, and further limits the first control point and the second control point to within a predetermined range.

* * * * *

UNITED STATES PATENT AND TRADEMARK OFFICE
CERTIFICATE OF CORRECTION

PATENT NO. : 8,300,934 B2
APPLICATION NO. : 12/805210
DATED : October 30, 2012
INVENTOR(S) : Shanshan Yu et al.

It is certified that error appears in the above-identified patent and that said Letters Patent is hereby corrected as shown below:

In the Claims:

Column 16, Line 9, In Claim 5, delete "with in" and insert -- within --, therefor.

Signed and Sealed this
Fourteenth Day of May, 2013

Teresa Stanek Rea
*Acting Director of the United States Patent and Trademark Office*